(12) United States Patent
Reynolds et al.

(10) Patent No.: US 11,721,955 B2
(45) Date of Patent: *Aug. 8, 2023

(54) ADJUSTABLE WIDTH POWER DISTRIBUTION BLOCK

(71) Applicant: Hubbell Incorporated, Shelton, CT (US)

(72) Inventors: Troy Reynolds, Derry, NH (US); Richard Robicheau, Litchfield, NH (US)

(73) Assignee: Hubbell Incorporated, Shelton, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/385,117

(22) Filed: Jul. 26, 2021

(65) Prior Publication Data

US 2021/0351575 A1   Nov. 11, 2021

Related U.S. Application Data

(63) Continuation of application No. 16/684,053, filed on Nov. 14, 2019, now Pat. No. 11,081,866.

(60) Provisional application No. 62/767,745, filed on Nov. 15, 2018.

(51) Int. Cl.
| | | |
|---|---|---|
| *H02B 1/052* | (2006.01) | |
| *H02B 1/48* | (2006.01) | |
| *H01R 9/26* | (2006.01) | |
| *H01R 9/24* | (2006.01) | |

(52) U.S. Cl.
CPC ......... *H02B 1/0523* (2013.01); *H01R 9/2491* (2013.01); *H01R 9/2608* (2013.01); *H02B 1/48* (2013.01)

(58) Field of Classification Search
CPC ...... H01R 9/2491; H01R 9/2608; H01R 9/24; H01R 13/506; H02B 1/0523; H02B 1/48
See application file for complete search history.

(56) References Cited

U.S. PATENT DOCUMENTS

| | | | |
|---|---|---|---|
| 2,892,176 | A | 6/1959 | Gordon |
| 2,983,897 | A | 5/1961 | Blanchet |
| 6,814,628 | B2 | 11/2004 | Chadbourne |
| 8,764,494 | B2 | 7/2014 | Joseph |
| 9,673,543 | B2 | 6/2017 | Reynolds |
| 11,081,866 | B2 * | 8/2021 | Reynolds ............... H02G 3/081 |

(Continued)

FOREIGN PATENT DOCUMENTS

WO   2015/063297 A1   5/2015

OTHER PUBLICATIONS

PCT/US2019/061481 International Search Report and Written Opinion dated Jan. 31, 2020 (12 pages).

(Continued)

*Primary Examiner* — Oscar C Jimenez
*Assistant Examiner* — Paul D Baillargeon
(74) *Attorney, Agent, or Firm* — Robinson + Cole LLP

(57) ABSTRACT

An electrical distribution block includes a first base, a second base, and a spacer plate discrete from the first and second base. The spacer plate is positioned between first base and the second base and secures the first base to the second base. A conductor block is connected to at least one of the first base or the second base. The conductor block includes a primary tap and a secondary tap.

20 Claims, 13 Drawing Sheets

(56) References Cited

U.S. PATENT DOCUMENTS

2015/0333421 A1 11/2015 Reynolds et al.
2016/0285216 A1 9/2016 Bury et al.

OTHER PUBLICATIONS

The Extended European Search Report dated Oct. 7, 2022, by the European Patent Office in corresponding European Patent Application No. 19885362.4. (13 pages).

* cited by examiner

ADJUSTABLE WIDTH POWER DISTRIBUTION BLOCK

RELATED APPLICATION(S)

This application is a continuation of U.S. application Ser. No. 16/684,053, filed Nov. 14, 2019, which is based on U.S. Provisional Application Ser. No. 62/767,745, filed Nov. 15, 2018, the disclosures of which are incorporated herein by reference in their entirety and to which priority is claimed.

FIELD

Various exemplary embodiments relate to electrical power distribution blocks.

BACKGROUND

Electrical power distribution blocks are used to connect two or more electrical conductors in a variety of environments. Distribution blocks are used to transfer power from primary conductors to secondary tap conductors of different sizes. The end of a primary conductor is stripped of insulation and inserted into a first port of a conductor block. The ends of one or more secondary tap conductors are similarly stripped of insulation and inserted into separate, respective tap ports. Electricity is transferred from the primary conductor to the secondary tap conductors through the electrically conductive conductor block.

Some examples of a power distribution blocks are described in U.S. Pat. No. 9,673,543, the disclosure of which is incorporated herein by reference in its entirety.

SUMMARY

According to an exemplary embodiment, an electrical distribution block includes a first base, a second base, and a spacer plate discrete from the first and second base. The spacer plate is positioned between first base and the second base and secures the first base to the second base. A conductor block is connected to at least one of the first base or the second base. The conductor block includes a primary tap and a secondary tap.

According to another exemplary embodiment, an electrical distribution block includes a first base having a first base mating feature and a second base having a second base mating feature. A spacer plate includes a first spacer mating feature and a second spacer mating feature, wherein the spacer plate is positioned between and connected to the first base and the second base. The first spacer mating feature engages the first base mating feature and the second spacer mating feature engages the second base mating feature. A conductor block is connected to the first base and the second base.

Another exemplary embodiment is directed to a method of assembling an electrical distribution block. A spacer plate is provided having a first spacer mating feature and a second spacer mating feature. A first base is connected to the first spacer mating feature. A second base is connected to the second spacer mating feature. A first sidewall having a first sidewall mating feature is connected to the first base. A second sidewall having a second sidewall mating feature is connected to the second base. A lid is connected to the first and second sidewalls.

BRIEF DESCRIPTION OF THE DRAWINGS

The aspects and features of various exemplary embodiments will be more apparent from the description of those exemplary embodiments taken with reference to the accompanying drawings, in which.

DETAILED DESCRIPTION OF EXEMPLARY EMBODIMENTS

Figure 1:
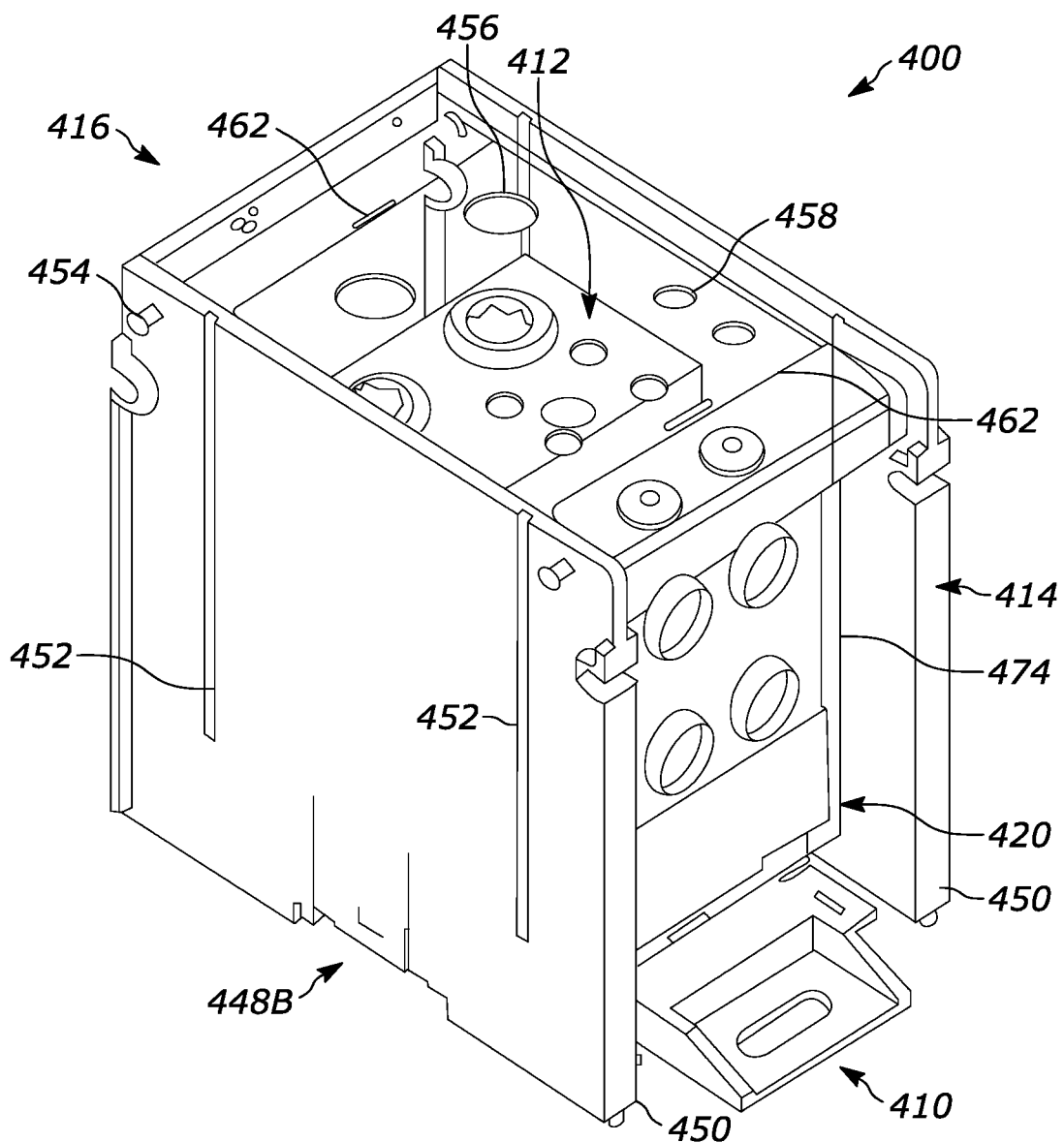
FIG. 1 is a top perspective view of another exemplary distribution block.
Figure 2:
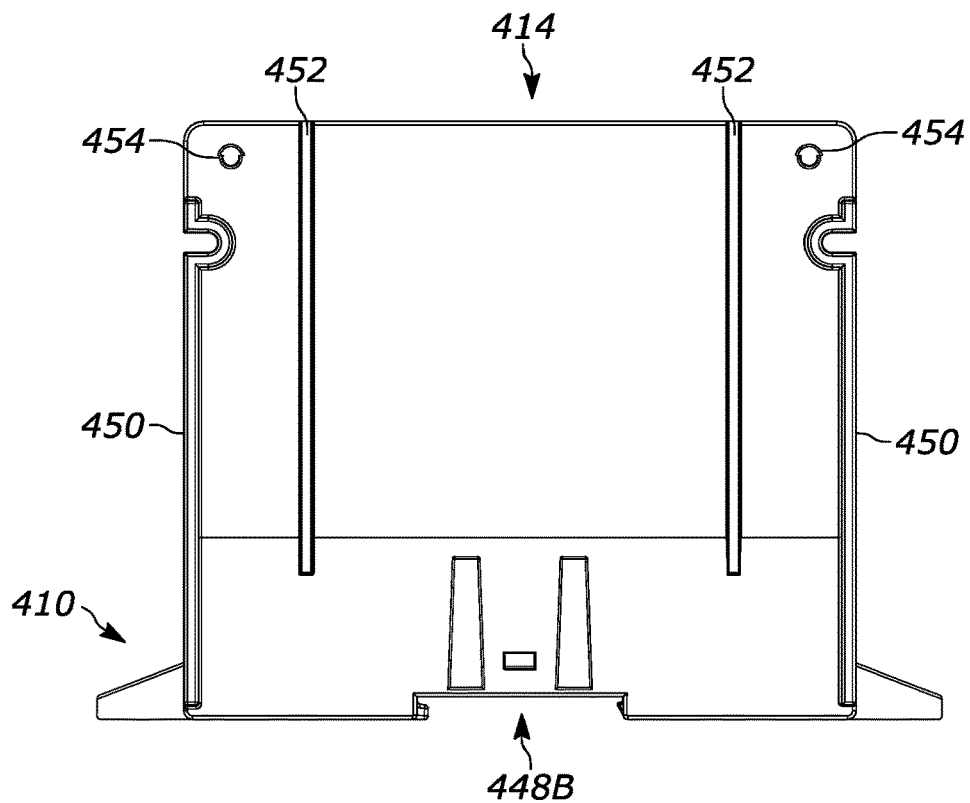
FIG. 2 is a right side view of the block shown in FIG. 1.
Figure 3:
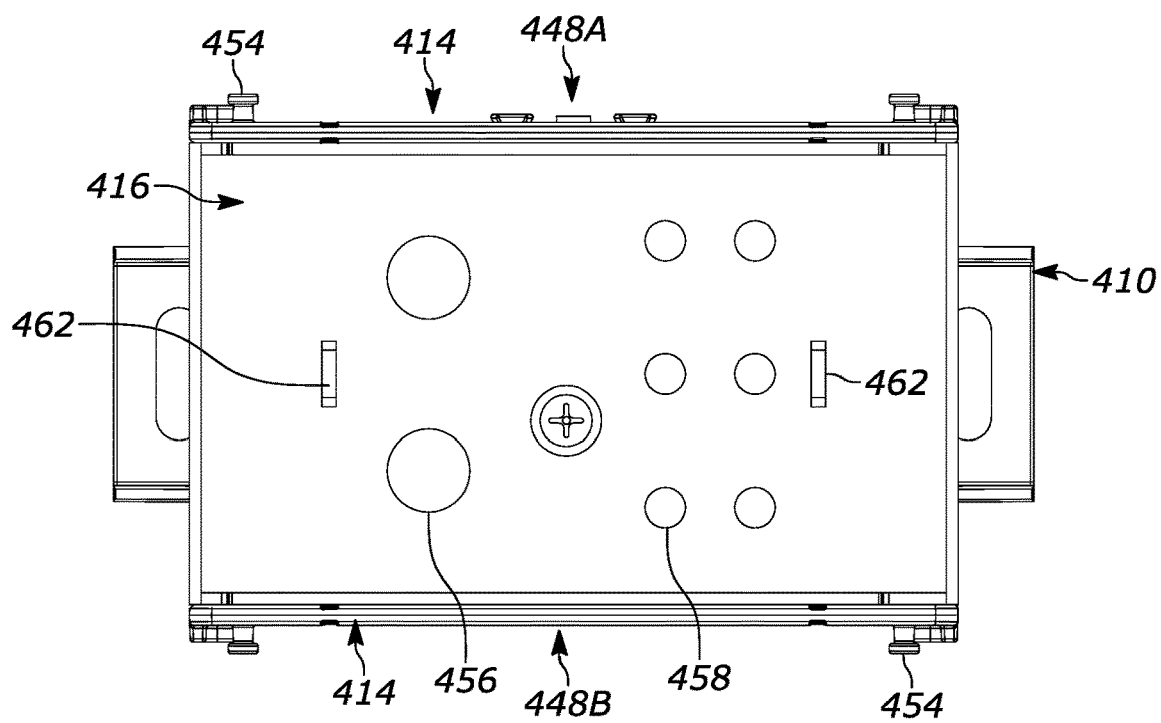
FIG. 3 is a top view of the block shown in FIG. 1.
Figure 4:
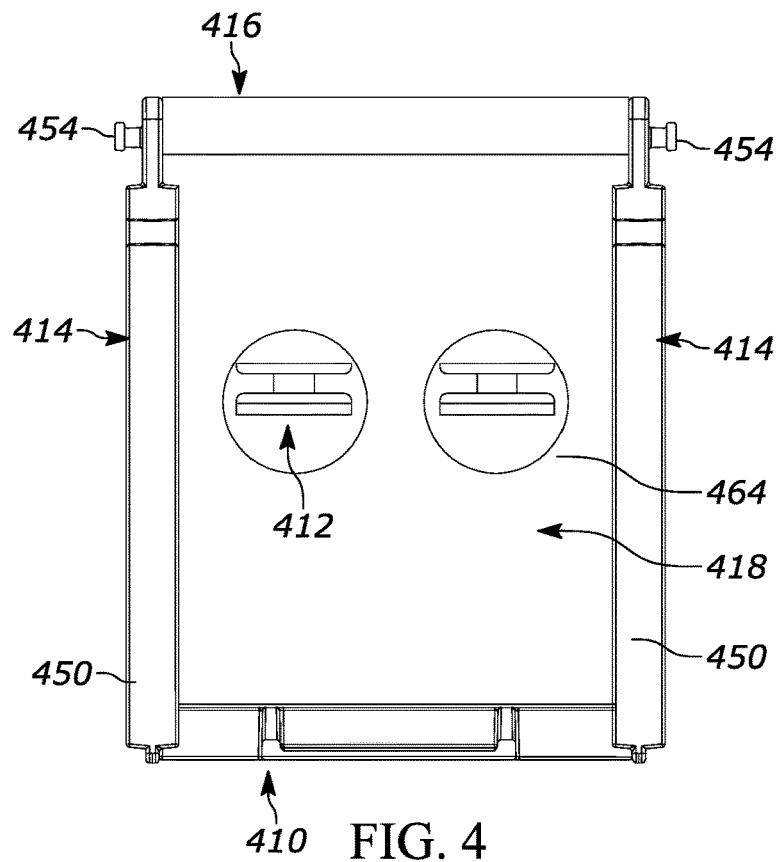
FIG. 4 is a rear view of the block shown in FIG. 1.
Figure 5:
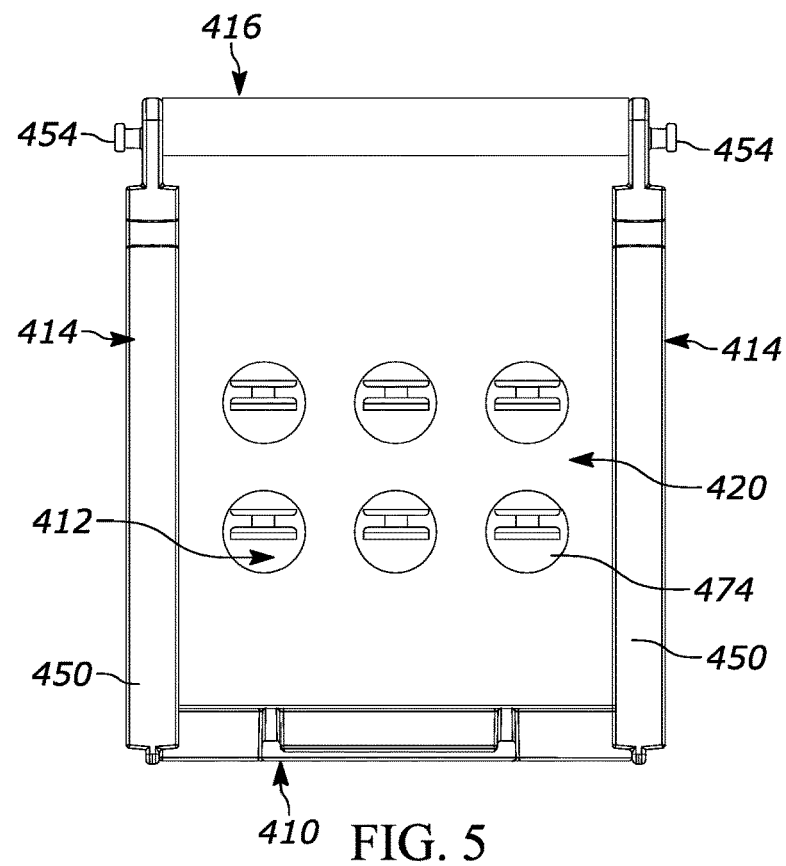
FIG. 5 is a front view of the block shown in FIG. 1.
Figure 6:
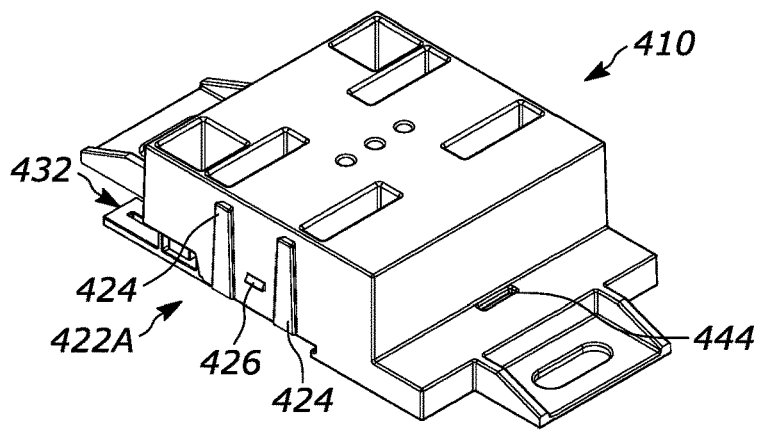
FIG. 6 is a top perspective view of an exemplary base.
Figure 7:
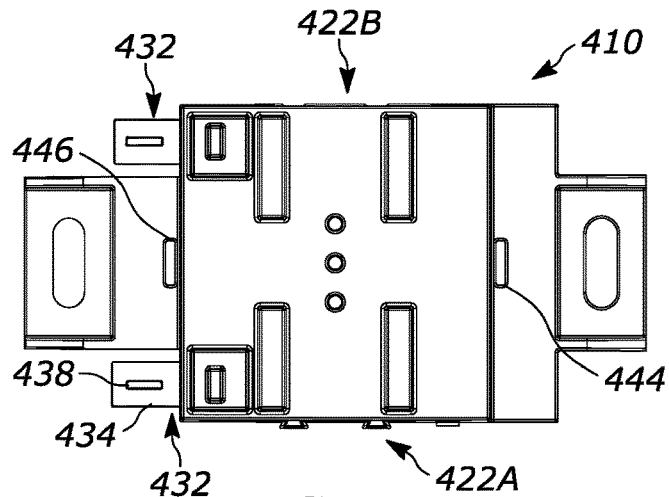
FIG. 7 is a top view of the base shown in FIG. 6.
Figure 8:
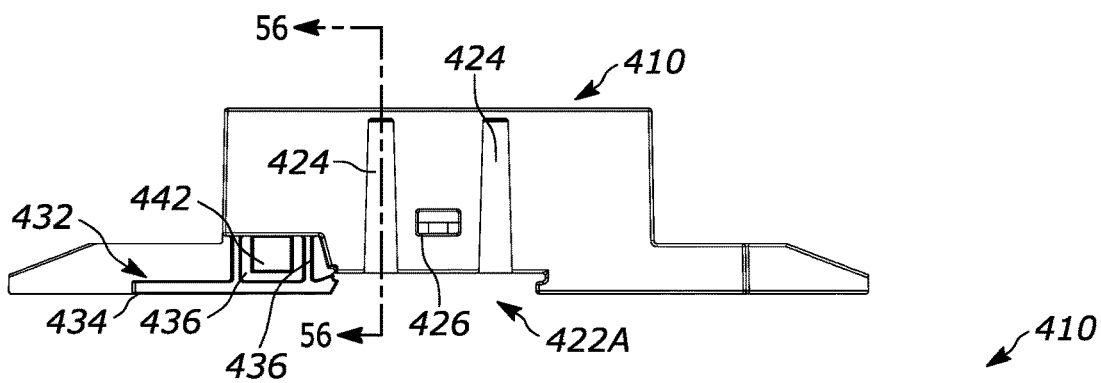
FIG. 8 is a right side view of the base shown in FIG. 6.
Figure 9:
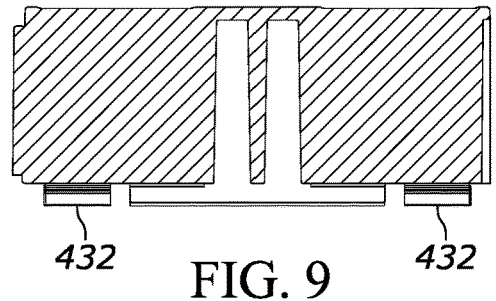
FIG. 9 is a sectional view of FIG. 8 taken along line 56-56.

In accordance with an exemplary embodiment, a distribution block assembly 400 includes a base 410, a conductor block 412, a pair of sidewalls 414, a top lid 416, a primary cover 418, and a tap cover 420 as shown in FIG. 1-5. The conductor block 12 receives, and electrically connects, a primary conductor (not shown) and one or more tap conductors (now shown). In various exemplary embodiments, the base 410 is made from a plastic or other polymer material and is molded as a unitary structure. Other suitable materials and methods of manufacturing the base 410 may be used. For example, the base 410 may be made from a ceramic, metal, elastomer, or composite material depending on the application. The base 410 may also be formed from separate components that are connected together. In certain embodiments, the base 410 is made from a non-conductive material so that it can be handled by a user when a live connection is made to the conductor block 412.

As shown in FIGS. 6-16, the base 410 includes one or more base mating features 422. The base mating features 422 include, for example, male mating features 422A on a first side and female mating features 422B on a second side, although any combination of male and female mating features may be used on each side.

Figure 15:
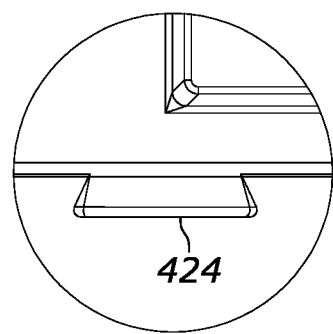
FIG. 15 is an enlarged, bottom view of area 62 of FIG. 13.
Figure 16:
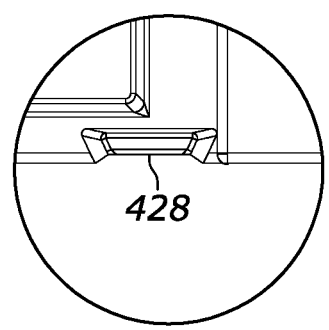
FIG. 16 is an enlarged, bottom view of area 63 of FIG. 13.
Figures 17, 18:
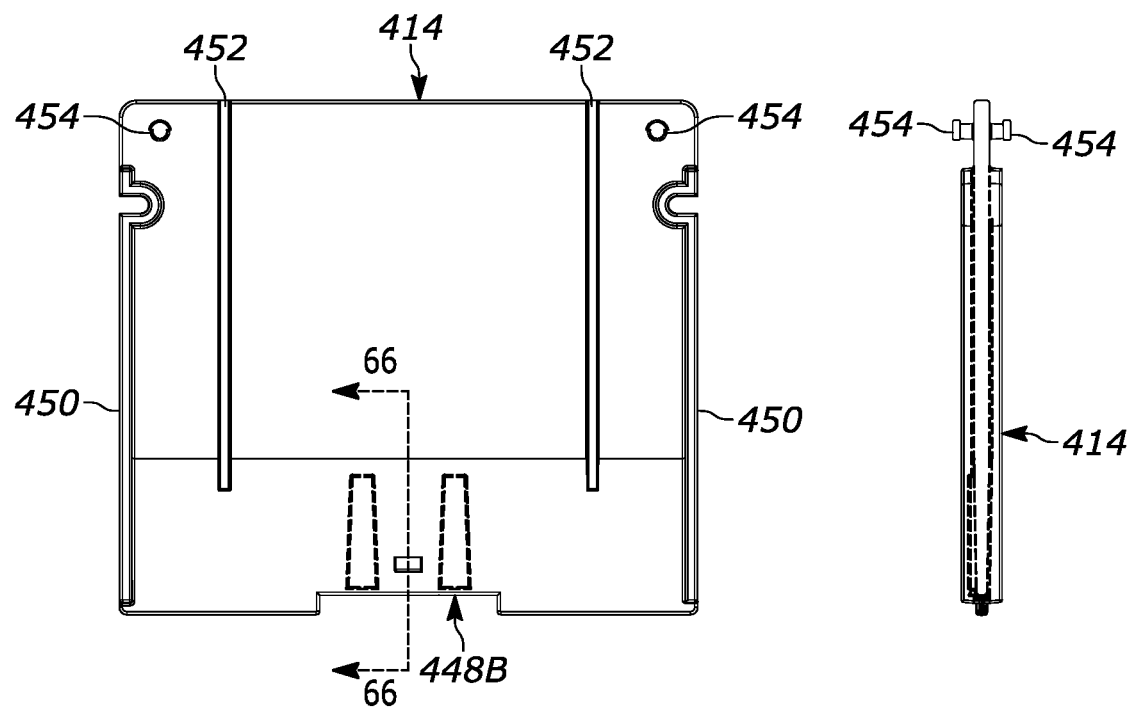
FIG. 17 is a right side elevational view of an exemplary sidewall.
FIG. 18 is a front view of the sidewall shown in FIG. 17.
Figures 19, 20:
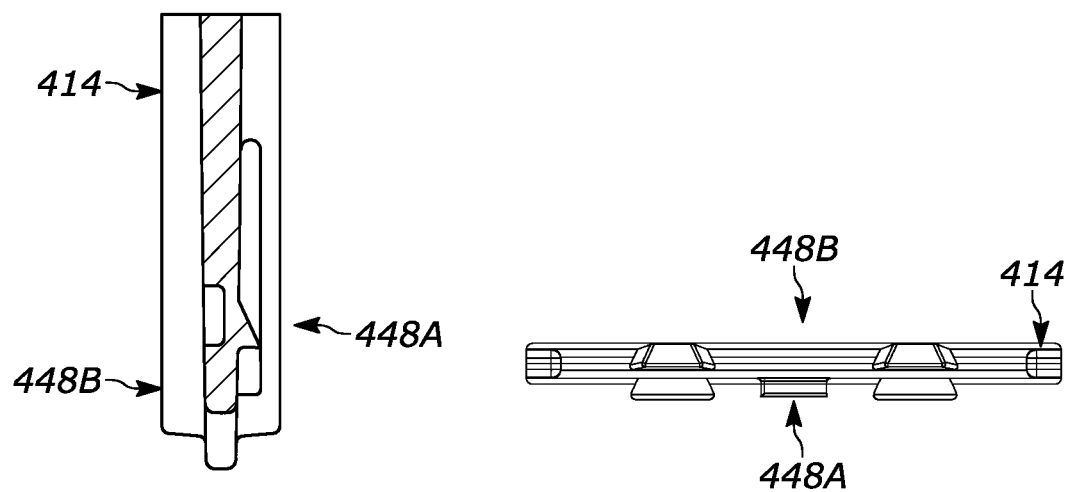
FIG. 19 a sectional view of FIG. 17 taken along line 66-66.
FIG. 20 is a partial, bottom view of the sidewall shown in FIG. 17.

The male mating features can include one or more protrusions 424 and a mating tab 426 extending from the base 410. In the illustrated exemplary embodiment, the mating tab 426 is positioned between two protrusions 424. In other embodiments, the mating tab 426 can be positioned outside of the protrusions 424. The protrusions 424 have a substantially planar, trapezoidal outer surface elongated in the vertical direction and tapering from the bottom to the top. As best shown in FIG. 15, the protrusions 424 taper from the outer surface towards the side of the base 410, although other configurations can be used. The mating tab 426 has a substantially triangular cross-section, although one or more of the vertices may be curved. The mating tab 426 has an angled top surface extending from the base 410 and a bottom facing towards the bottom of the base 410.

According to an exemplary embodiment, the female mating features include one or more sockets 428 extending into the base 410 and a mating opening 430 extending into or through the second side of the base 410. In the illustrated exemplary embodiment, the mating opening 430 is positioned between the two sockets 428. The sockets 428 have a substantially planar, trapezoidal opening elongated in the vertical direction and tapering from the bottom to the top. The sockets 428 taper from a back wall to the opening, to form a mating relationship with the tapered protrusions 424. The mating opening 430 is a rectangular or square opening configured to receive the mating tab 426. Alternative configurations of male and female mating features can also be used.

Figure 10:
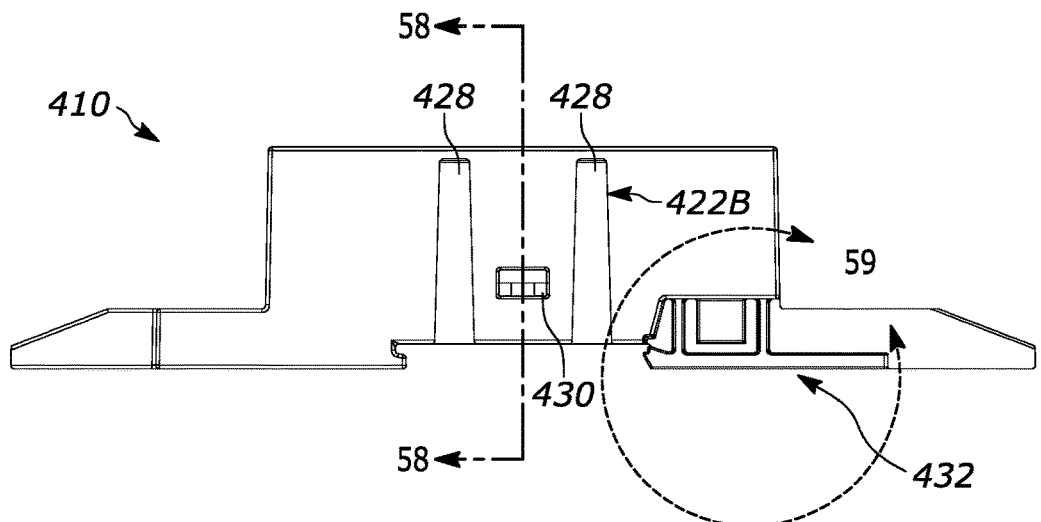
FIG. 10 is a left side view of the base shown in FIG. 6.
Figure 11:
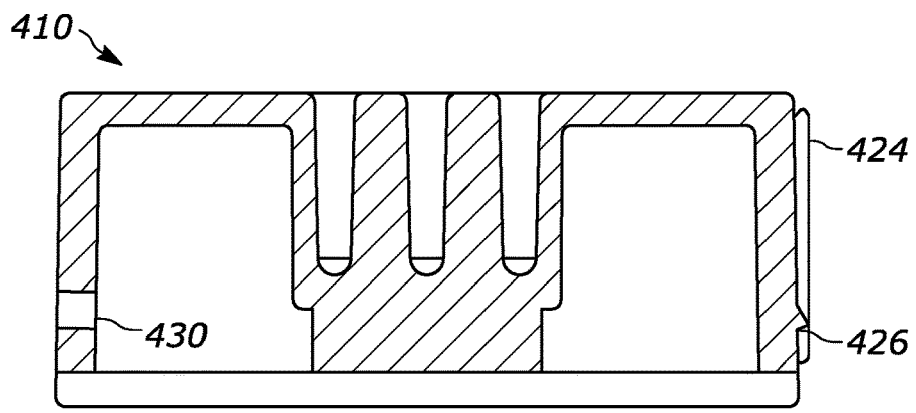
FIG. 11 is a sectional view of FIG. 10 taken along line 58-58.
Figure 12:
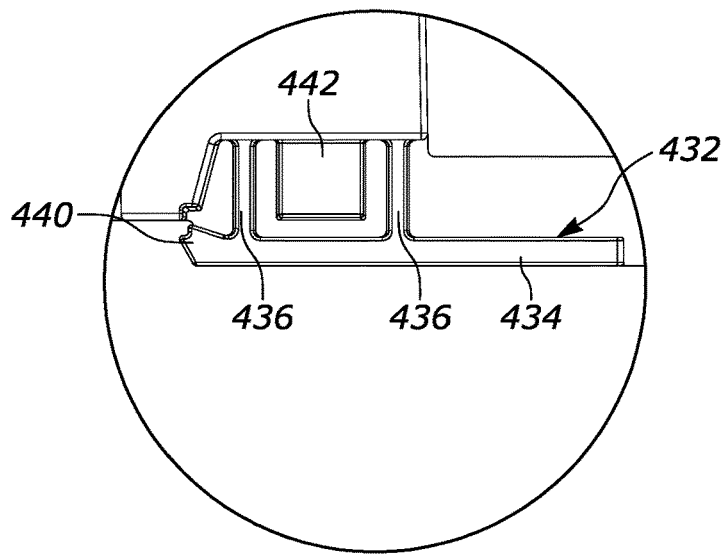
FIG. 12 is an enlarged, right side view of area 59 of FIG. 10.
Figure 13:
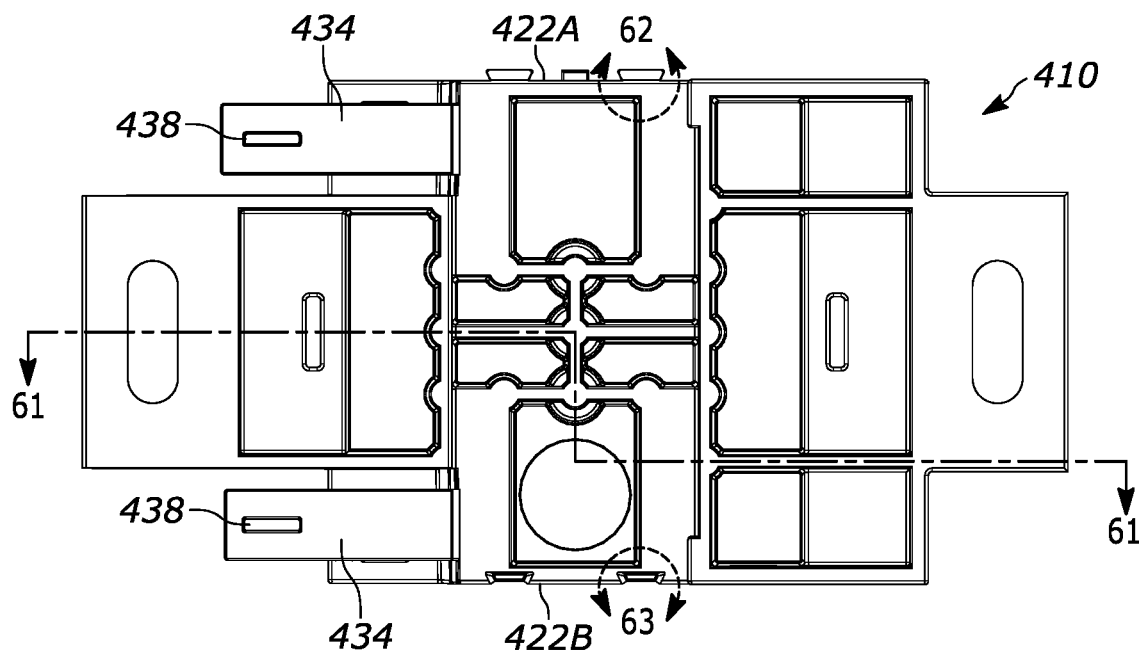
FIG. 13 is a bottom view of the base shown in FIG. 6.
Figure 14:
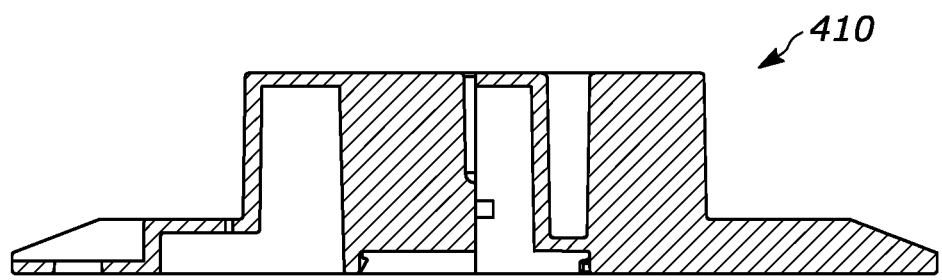
FIG. 14 is a sectional view of FIG. 13 taken along line 61-61.

As best shown in FIGS. 10-12, the base 410 includes a support connecting feature that is used to connect the base to a supporting structure. For example, the base 410 includes a channel for receiving a supporting structure such as a DIN rail. A release mechanism 432 is configured to release the base 410 from the supporting structure. The release mechanism 432 can include a leg 434 and a pair of columns 436 extending from a portion of the base 410 and connecting to the leg 434. The leg 434 includes a slot 438 at a first end and a prong 440 at a second end.

The base 410 can be snap fit onto the DIN rail and the leg 434 may bend or flex to allow for the connection to the DIN rail. To release the base 410, a user can insert a tool, such as a flat head screwdriver, into the slot 438 and apply a force to pull the prong 440 away from the DIN rail. The leg 434 pivots about the columns 436 to move the prong 440 out of engagement with the DIN rail and release the base 410. A block 442 positioned between the columns 436 limits the movement of the columns to prevent over bending, breaking, or other damage to the columns 436. The user may alternatively apply a force by hand to release the base 410.

In an exemplary embodiment, the base 410 includes a first slot 444 and a second slot 446 positioned to receive a cover mounting feature. The base may also include one or more cavities in the top and bottom surfaces to reduce the amount of material used, and to enable effective molding of the base 410.

FIGS. 17-20 depict an exemplary embodiment of a sidewall 414. The sidewall 414 includes a first side having first sidewall mating features 448A and a second side having second sidewall mating features 448B. The first and second sidewall mating features 448A, 448B are configured to mate with the base mating features 422A, 422B. In the illustrated embodiment, the first sidewall mating features 448A are male mating features and the second sidewall mating features 448B are female mating features.

The sidewall 414 includes a first and second flange 450 extending at least partially along a first and second edge, respectively. The first and second flanges 450 include an opening, for example a U-shaped opening that may be used to receive or connect to various styles of lids.

In an exemplary embodiment, the sidewall 414 includes first and second channels 452 for receiving a primary cover 418 and a tap cover 420. The lid also includes one or more lid mounting features 454 for attaching a variety of lids to the base 410 and sidewall 414. In an exemplary embodiment, the lid mounting features 454 include a protrusion having a first cylindrical portion extending from the sidewall and a knob or other enlarged section at the end of the cylindrical portion.

Figure 21:
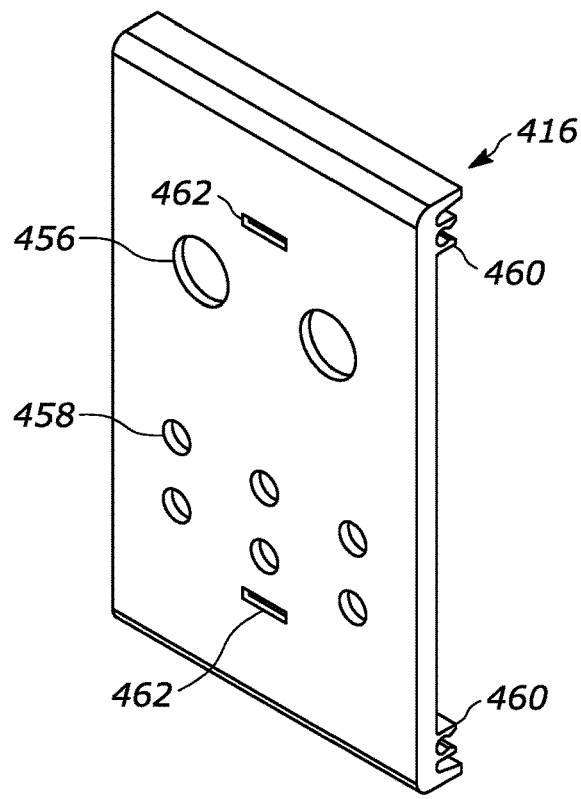
FIG. 21 is a top perspective view of an exemplary lid.
Figure 22:
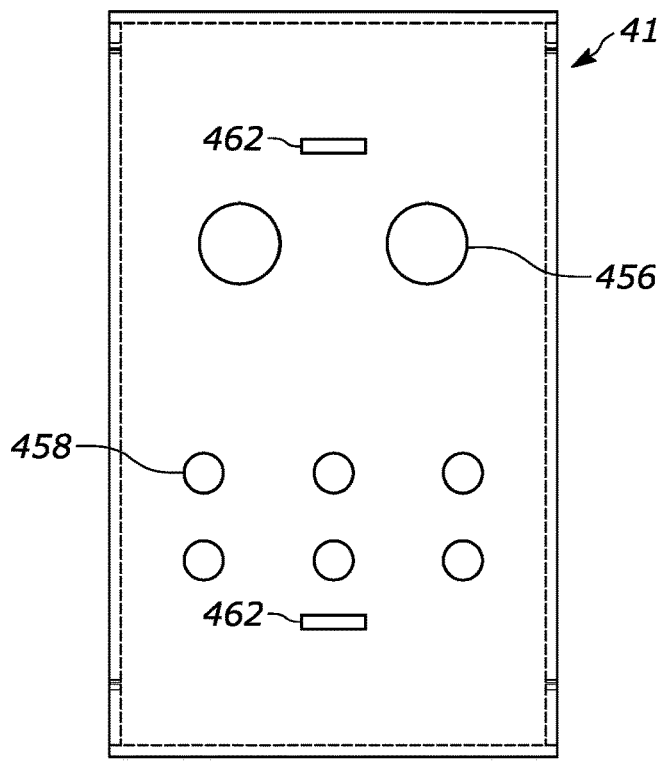
FIG. 22 is a top view of the lid shown in FIG. 21.
Figure 23:
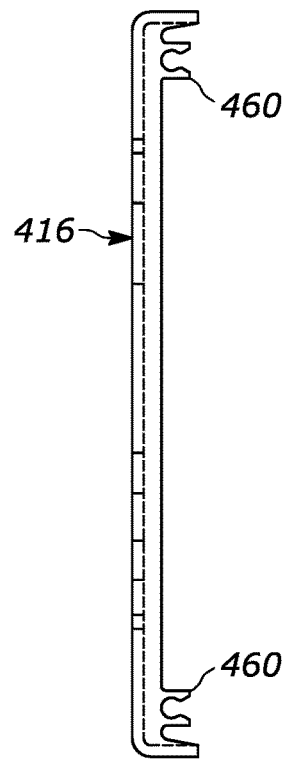
FIG. 23 is a right side view of the lid shown in FIG. 21.

FIGS. 21-23 depict an exemplary embodiment of a lid 416 having one or more primary apertures 456 and one or more tap apertures 458. The primary and tap apertures 456, 458 provide access to set screws in the conductor block 412. In various exemplary embodiments, the primary and tap apertures 456, 458 are finger-safe apertures sized to allow a tool or driver to be inserted through the lid 416 but prevent a user's finger from being placed through the lid 416 and in contact with the conductor block 412.

In an exemplary embodiment, the lid 416 includes lid connecting features 460 to connect the lid 416 to the sidewalls 414 by engaging the lid mounting features 454. In the illustrated exemplary embodiment, the lid connecting features 460 have a downwardly facing opening for mating with the lid mounting features 454. The openings may be substantially U-shaped or a half circle. The openings allow the lid connecting features 460 to snap-connect to the projections of the lid mounting features 454. The lid also includes a first and second slot 462 positioned to receive a portion of the primary and tap covers 418, 420. The exemplary distribution block 400 may utilize different lids than the one shown, including a non-finger safe style lid which may be similar to the lid 416 but pivotally connect to the sidewalls 414 and omit the primary and tap apertures 456, 458.

Figure 24:
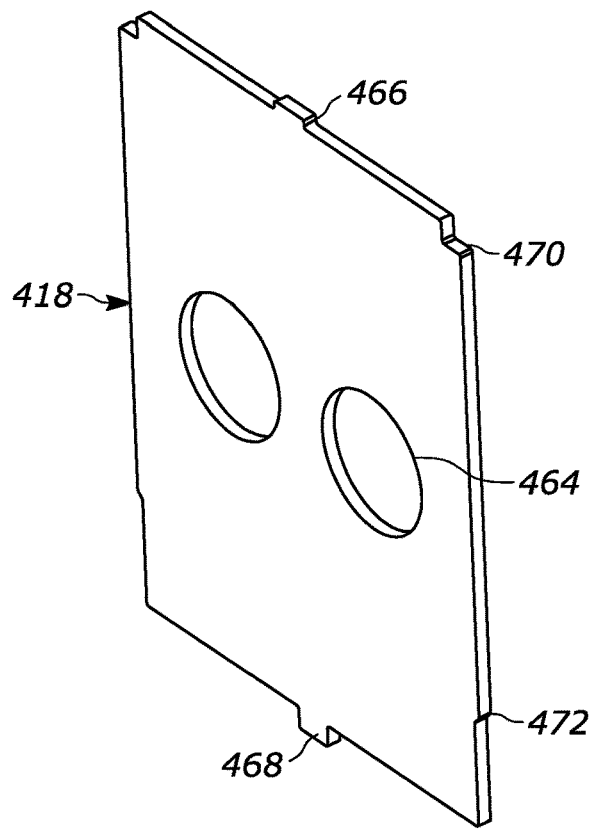
FIG. 24 is a top perspective view of an exemplary cover.
Figure 25:
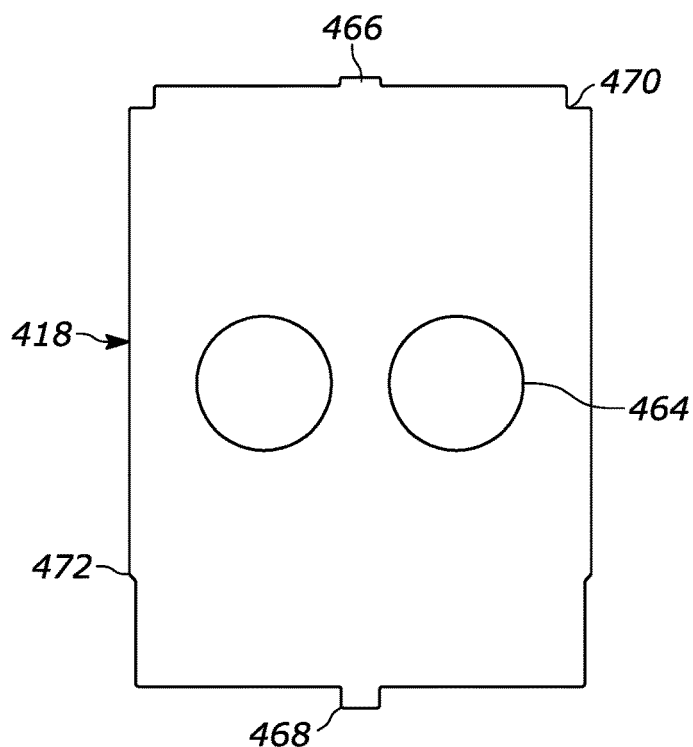
FIG. 25 is a front view of the cover shown in FIG. 24.

FIGS. 24 and 25 depict an exemplary primary cover 418. The primary cover 418 has one or more openings 464, for example two, to allow passage of conductors through the primary cover 418 to the conductor block 412. Two live primary conductors may be inserted into the distribution block 400 or the second opening 464 may be used to electrically power a tap conductor from the distribution block. The primary cover includes a top tab 466 and a bottom tab 468. The primary cover 418 is inserted into the channels 452 of the sidewall 414 and the bottom tab 468 is received in one of the first and second slots 444, 446 in the base 410. The top tab 466 is received in one of the slots 462 in the lid. The primary cover 418 includes a top pair of shoulders 470 for engaging or receiving a flange from the lid 416 and a bottom pair of shoulders 472 for engaging or receiving a flange or other thickened portion of the sidewall 414. In various exemplary embodiments, a tap cover has substantially the same configuration as the primary cover 418 with one or more tap conductor openings 474.

Figure 26:
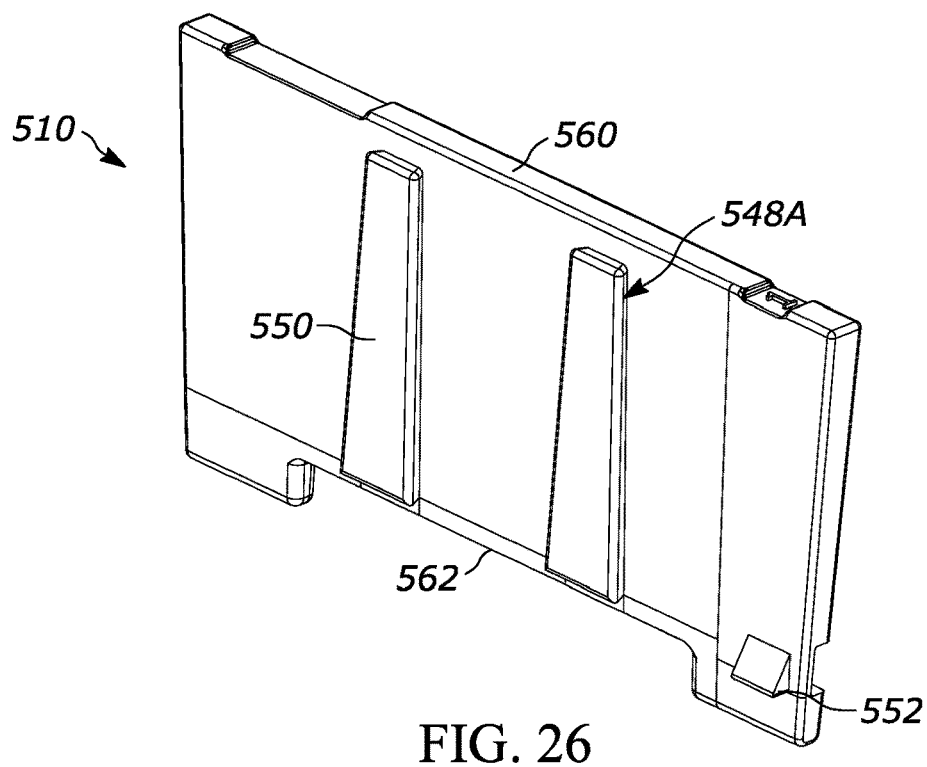
FIG. 26 is a first side perspective view of an exemplary spacer plate.
Figure 27:
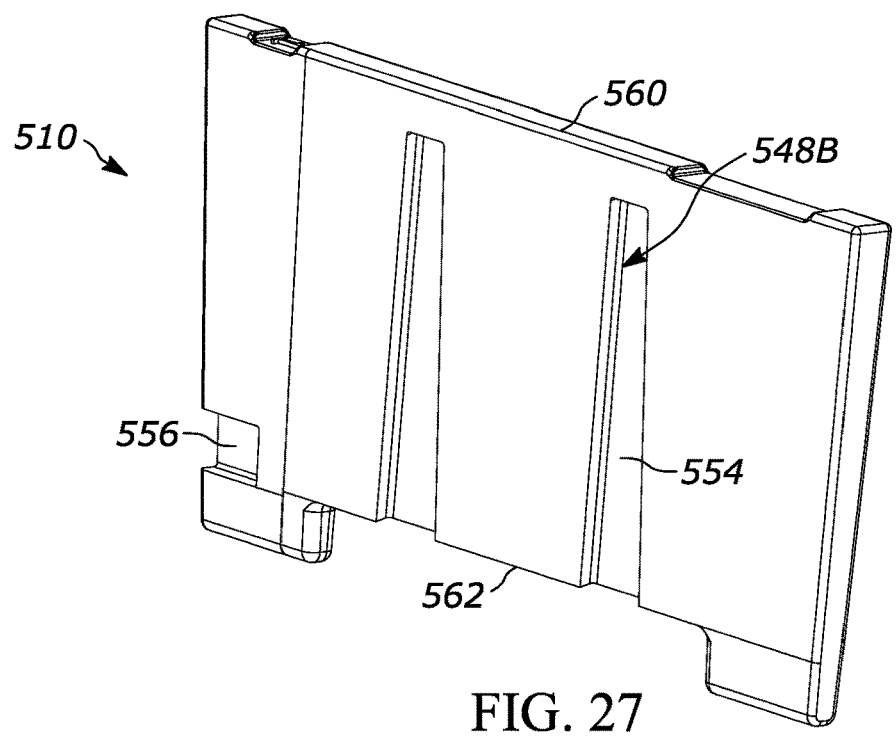
FIG. 27 is a second side perspective view of the spacer plate of FIG. 26.

FIGS. 26 and 27 depict an exemplary spacer plate 510 that can be used to connect a pair of bases 410. The spacer plate 510 includes a first side having first spacer mating features 548A and a second side having second spacer mating features 548B. The first and second spacer mating features 548A, 548B are configured to mate with the base mating features 422A, 422B. In the illustrated embodiment, the first spacer mating features 548A are male mating features and the second spacer mating features 548B are female mating features.

The male mating features can include one or more protrusions 550 and a mating tab 552 extending from the spacer 510. In the illustrated embodiment, the mating tab 552 is positioned outside two protrusions 550. The protrusions 550 have a substantially planar, trapezoidal outer surface elongated in the vertical direction and tapering from the bottom to the top. The protrusions 550 also taper from the outer surface towards the side of the spacer 510, although other configurations can be used. The mating tab 552 has a substantially triangular cross-section, although one or more of the vertices may be curved. The mating tab 552 has an angled top surface extending from the spacer 510 and a bottom facing towards the bottom of the spacer 510.

According to an exemplary embodiment, the female mating features include one or more sockets 554 extending into the spacer 510 and a mating opening 556 extending into or through the second side of the spacer 510. The sockets 554 have a substantially planar, trapezoidal opening elongated in the vertical direction and tapering from the bottom to the top. The sockets 554 taper from a back wall to the opening, to form a mating relationship with the tapered protrusions 550. The mating opening 556 is a rectangular or square opening configured to receive the mating tab 552. Alternative configurations of male and female mating features can also be used.

The spacer plate 510 includes a top edge 560 that is configured to be positioned at or below an upper surface of the base 410. The spacer plate 510 can also include a bottom channel 562 configured to align with or receive a support structure, such as a DIN rail.

Figure 28:
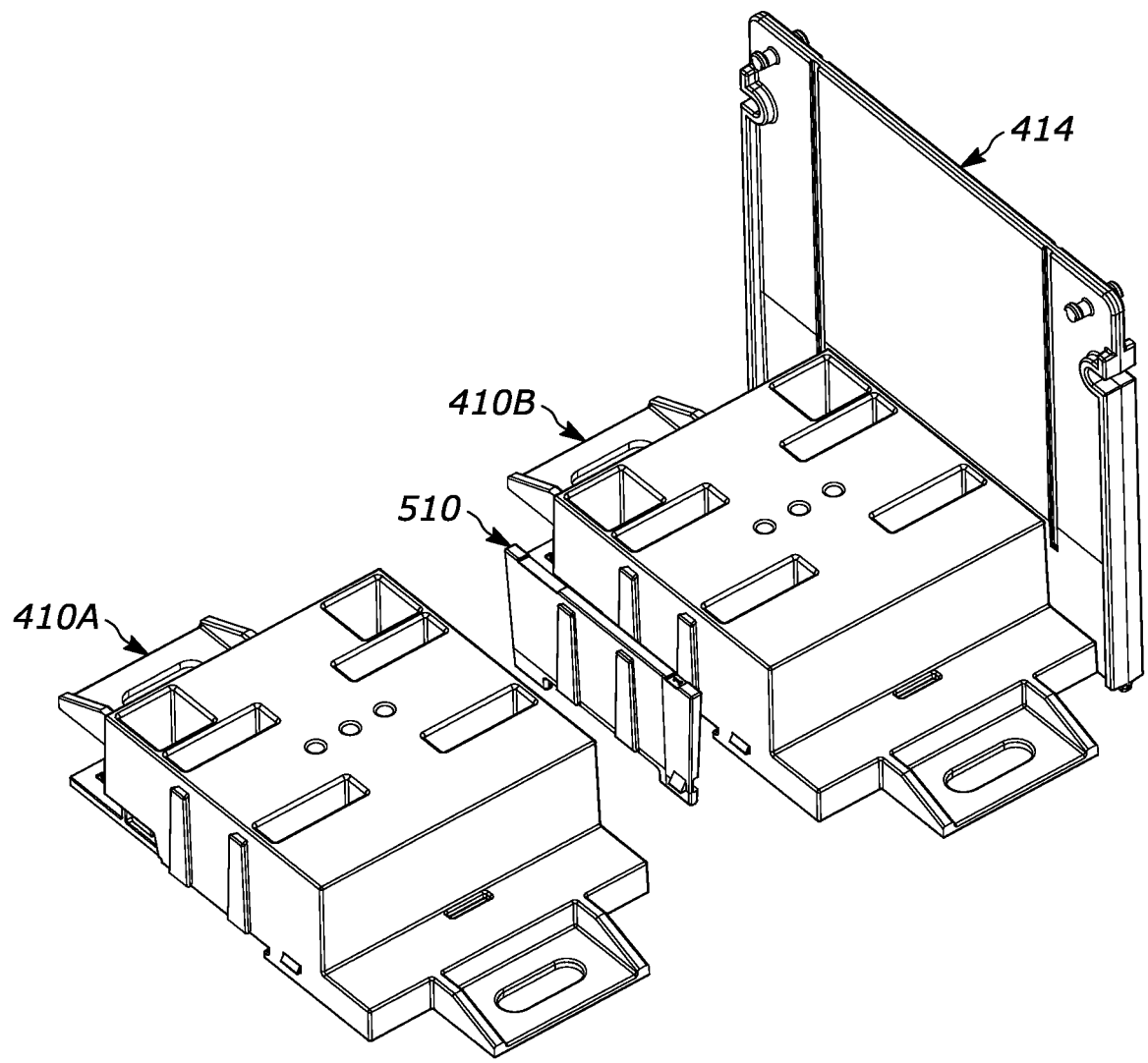
FIG. 28 is perspective view of a pair of bases, the spacer plate, and a sidewall.
Figure 29:
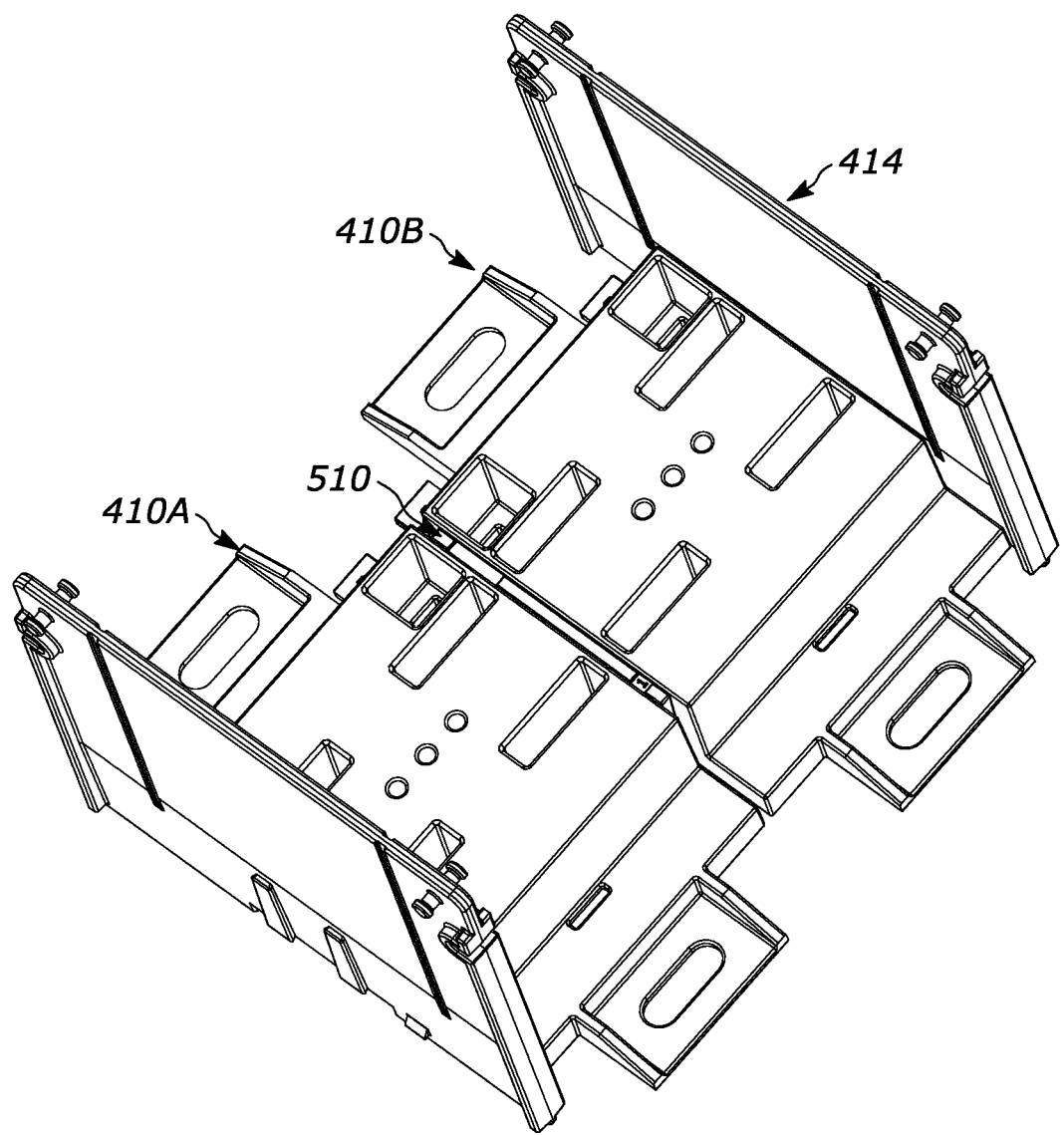
FIG. 29 is a perspective view of the spacer plate connecting a pair of bases and a sidewall connected to each base.
Figure 30:
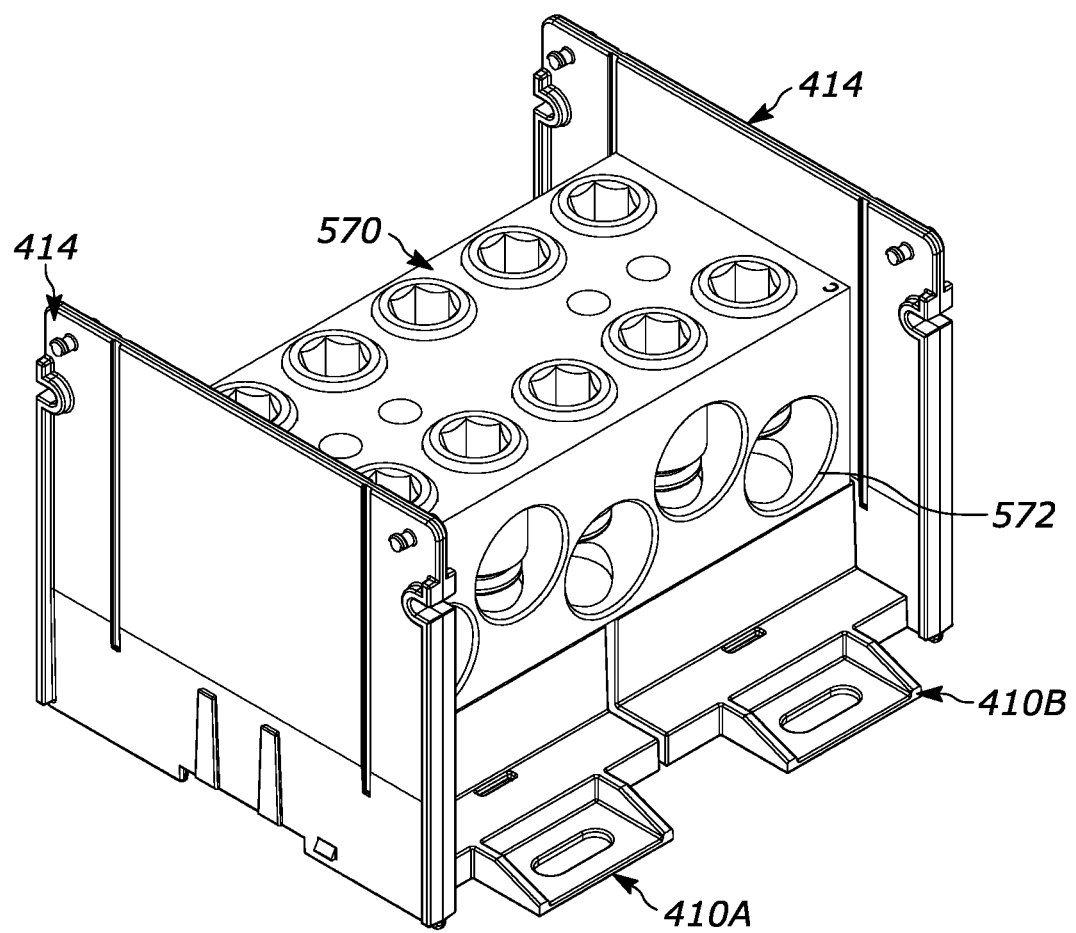
FIG. 30 is a perspective view of a conductor block connected to the assembly shown in FIG. 29.

As shown in FIGS. 28-30, the spacer plate 510 is positioned between and connects a first base 410A and a second base 410B. This provides a combined base that can receive a double wide conductor block 570. The conductor block 570 includes a set of taps 572 for receiving one or more primary and secondary conductors. Multiple spacer plates can be used to create a base that is as wide as needed to any size conductor block.

Various different exemplary embodiments are described herein and any feature or component of any embodiment may be combined or replaced with any other feature of component to form an exemplary distribution block.

The foregoing detailed description of the certain exemplary embodiments has been provided for the purpose of explaining the general principles and practical application, thereby enabling others skilled in the art to understand the disclosure for various embodiments and with various modifications as are suited to the particular use contemplated. This description is not necessarily intended to be exhaustive or to limit the disclosure to the exemplary embodiments disclosed. Any of the embodiments and/or elements disclosed herein may be combined with one another to form various additional embodiments not specifically disclosed. Accordingly, additional embodiments are possible and are intended to be encompassed within this specification and the scope of the appended claims. The specification describes specific examples to accomplish a more general goal that may be accomplished in another way.

As used in this application, the terms "front," "rear," "upper," "lower," "upwardly," "downwardly," and other orientational descriptors are intended to facilitate the description of the exemplary embodiments of the present application, and are not intended to limit the structure of the exemplary embodiments of the present application to any particular position or orientation. Terms of degree, such as "substantially" or "approximately" are understood by those of ordinary skill to refer to reasonable ranges outside of the given value, for example, general tolerances associated with manufacturing, assembly, and use of the described embodiments.

What is claimed:

1. An electrical distribution block comprising:
a first base having a first bottom support surface and a first upper receiving surface;
a second base having a second bottom support surface and a second upper receiving surface, the second base being removably connected to the first base via a spacer plate; and,
a conductor block including a primary tap and a plurality of secondary taps, the conductor block connected to the first base and the second base so that the conductor block extends over at least a portion of the first upper receiving surface and at least a portion of the second upper receiving surface.

2. The electrical distribution block of claim 1, further comprising a first sidewall connected to the first base and a second sidewall connected to the second base, and wherein the conductor block extends between the first and second sidewalls.

3. The electrical distribution block of claim 2, further comprising a lid connected to the first and second sidewalls.

4. The electrical distribution block of claim 1, wherein the spacer plate is positioned between the first base and the second base, and wherein the spacer plate includes an upper edge positioned at or below an upper surface of the first base and an upper surface of the second base.

5. The electrical distribution block of claim 4, wherein the spacer plate includes a bottom channel configured to receive a support structure.

6. The electrical distribution block of claim 5, wherein the support structure is a DIN rail.

7. The electrical distribution block of claim 4, wherein the spacer plate includes a first spacer mating feature and a second spacer mating feature, wherein the first spacer mating feature engages the first base and the second spacer mating feature engages the second base.

8. The electrical distribution block of claim 7, wherein the first base has a first base mating feature and the second base has a second base mating feature, and wherein the first spacer mating feature engages the first base mating feature and the second spacer mating feature engages the second base mating feature.

9. The electrical distribution block of claim 8, wherein the first spacer mating feature includes a first spacer socket and a second spacer socket and the second spacer mating feature includes a first spacer protrusion and a second spacer protrusion.

10. The electrical distribution block of claim 7, wherein the first spacer mating feature slidably engages the first base and the second spacer mating feature slidably engages the second base.

11. An electrical distribution block comprising:
a first base having a first bottom support surface, a first upper receiving surface, and a first base mating feature;

a second base having a second bottom support surface, a second upper receiving surface, and a second base mating feature, the second base removably connected to the first base via a spacer plate;

a first sidewall connected to the first base and extending above the first upper receiving surface;

a second sidewall connected to the second base and extending above the second upper receiving surface; and a conductor block including a primary tap and a plurality of secondary taps, the conductor block connected to the first base and the second base so that the conductor block extends between the first sidewall and the second sidewall and over at least a portion of the first upper receiving surface and at least a portion of the second upper receiving surface.

12. The electrical distribution block of claim 11, further comprising a lid connected to the first and second sidewalls.

13. The electrical distribution block of claim 11, wherein the first base mating feature includes a first base protrusion and a second base protrusion and the second base mating feature includes a first base socket and a second base socket.

14. The electrical distribution block of claim 11, wherein the spacing plate includes a first spacer mating feature and a second spacer mating feature, wherein the spacer plate is positioned between and connected to the first base and the second base, with the first spacer mating feature engaging the first base mating feature and the second spacer mating feature engaging the second base mating feature; further comprising.

15. The electrical distribution block of claim 14, wherein the first spacer mating feature includes a first spacer socket and a second spacer socket and the second spacer mating feature includes a first spacer protrusion and a second spacer protrusion.

16. The electrical distribution block of claim 14, wherein the spacer plate includes an upper edge positioned at or below an upper surface of the first base and an upper surface of the second base.

17. The electrical distribution block of claim 14, wherein the spacer plate includes a bottom channel configured to receive a support structure.

18. The electrical distribution block of claim 17, wherein the support structure is a DIN rail.

19. A method of assembling an electrical distribution block comprising:

connecting, via a spacer plate, a first base having a first bottom support surface and a first upper receiving surface to a second base having a second bottom support surface and a second upper receiving surface;

connecting a first sidewall to the first base;

connecting a second sidewall to the second base;

connecting a conductor block to the first base and the second base so that the conductor block extends between the first sidewall and the second sidewall and over at least a portion of the first upper receiving surface and at least a portion of the second upper receiving surface; and connecting a lid to the first and second sidewalls.

20. The method of claim 19, further comprising slidably engaging the first base and the second base with the spacer plate.

\* \* \* \* \*